United States Patent [19]
Burch

[11] Patent Number: 6,164,049
[45] Date of Patent: *Dec. 26, 2000

[54] MULTIPLE BLADE BRUSH-CUTTING MOWER

[76] Inventor: Thomas B. Burch, P.O. Box 1046, North Wilkesboro, N.C. 28659

[ * ] Notice: This patent is subject to a terminal disclaimer.

[21] Appl. No.: 09/208,199

[22] Filed: Dec. 9, 1998

Related U.S. Application Data

[63] Continuation-in-part of application No. 09/011,589, filed as application No. PCT/US96/13362, Aug. 16, 1996, Pat. No. 6,125,621.
[60] Provisional application No. 60/002,397, Aug. 17, 1995, provisional application No. 60/007,633, Nov. 28, 1995, provisional application No. 60/069,109, Dec. 9, 1997, and provisional application No. 60/076,101, Feb. 26, 1998.

[51] Int. Cl.[7] .................................................. A01C 15/00
[52] U.S. Cl. ....................... 56/16.8; 56/16.4 R; 56/16.4 A
[58] Field of Search ........................ 56/1, 16.4 R, 16.4 A, 56/16.8, 16.9, 255, 295, DIG. 5; 239/121, 172, 129, 169

[56] References Cited

U.S. PATENT DOCUMENTS

| | | | |
|---|---|---|---|
| 2,908,444 | 10/1959 | Mullin | 56/16.8 |
| 2,939,636 | 6/1960 | Mullin | 56/16.8 |
| 4,926,622 | 5/1990 | McKee | 56/16.8 |
| 5,195,308 | 3/1993 | Grote et al. | 56/16.4 R |
| 5,329,752 | 7/1994 | Milbourn | 56/16.4 R |

*Primary Examiner*—Robert E. Pezzuto
*Attorney, Agent, or Firm*—Dougherty & Clements LLP

[57] ABSTRACT

A multiple blade brush-cutting mower apparatus is provided for cutting vegetation and brush, and for applying treatment liquids directly from the cutting blades onto the cut ends of vegetation at the moment of cutting. The mower is attachable to either the front or rear end of a standard tractor. The mower provides multiple pairs of blades staggered across the width of the mower, providing consistent blade edge exposure to cut vegetation over areas as wide as the width of the tractor. The mower incorporates a completely closed treatment fluid application system that directly applies treatment fluids (herbicides, fertilizers, sterilizing agents, and growth regulators) onto the lower surface of the cutting blades, for simultaneous application of treatment fluids to cut vegetation stems at the time of initial cutting. At the moment of cutting, treatment fluid is simultaneously applied to the cut stems, applying fluid into the cut, open pores, with resulting transfer of fluids down through the pores into the plant roots. The multiple blade configuration clears vegetation efficiently at a lower costs, with substantially less application of toxic chemicals per treated acre than existing large single blade mowers and spraying operations. The multiple blades are relatively small, lightweight, easily maintained, yet efficiently cut brush, up to approximately six inches in diameter. The multiple blades require a smaller horsepower tractor for operating the multiple blade mower, with elimination of treatment fluid overspray to the ground.

44 Claims, 9 Drawing Sheets

MULTIPLE BLADE BRUSH-CUTTING MOWER

CROSS-REFERENCE TO RELATED APPLICATIONS

This application is a continuation-in-part of U.S. Application No. 09/011,589, filed on Feb. 9, 1998 now U.S. Pat. No. 6,125,621; which was the National Stage of International Application, No. PCT/US96/13362, filed on Aug. 16, 1996, which claims the benefit of U.S. Provisional Application No. 60/002,397, filed on Aug. 17, 1995, and U.S. Provisional Application No. 60/007,633, filed on Nov. 28, 1995; and claims the benefit of U.S. Provisional Application No. 60/069,109, filed on Dec. 9, 1997; and U.S. Provisional Application No. 60/076,101, filed on Feb. 26, 1998.

FIELD OF THE INVENTION

The present invention relates to an apparatus and a method for cutting and treating vegetation. More particularly, the invention relates to a multiple cutting blade mower that may be attached to the front end or the rear end of a standard tractor, and may simultaneously cut and apply a treatment fluid to the cut, open stems of the cut vegetation.

BACKGROUND

Mowers are particularly useful for cutting grass, for clearing brush, for maintaining fields, and for performing many other landscaping functions. Because tractors can operate in virtually any terrain, it is desirable to attach a mower to a tractor. Brush-cutting mowers are used extensively to clear vegetation from large tracts of land. Large single blade brush-cutting mowers are well known in the art, and are typically integrally attached to the rear end of a specially manufactured tractor.

In one particular application, brush-cutting mowers are used to cut vegetation growing in powerline right-of-ways. The vegetation in a powerline right-of-way must be periodically cut to maintain access to the powerlines and to minimize energy losses from the powerlines. Access is required to facilitate service and repair of the powerlines. Excessive energy losses may occur when high, dense vegetation beneath the powerlines draw electricity out of the overhead powerlines. In another application, brush-cutting mowers are periodically used to cut the vegetation that grows in medians and along roadways. Cutting the vegetation in those areas improves visibility and provides a shoulder along the road for emergency stops and for pedestrian and bicycle traffic. Another application is on pipeline rights-of-way above pipelines, where vegetation may interfere with pipeline walkovers and aerial inspections. The ability to cut, and simultaneously apply treatment fluids to the root system of vegetation, to kill or reduce the growth of vegetation within powerline rights-of-way, is highly beneficial for reducing costs of pipeline inspections.

Existing brush-cutting mowers either have a relatively expensive single blade that approximates the width of the tractor to which it is attached or have a relatively inexpensive single blade that is considerably narrower than the width of the tractor to which it is attached. Neither of those options provide an adequate means for clearing vegetation from a parcel of land.

A longer blade results in an increased cut path and thereby reduces the number of passes the tractor operator needs to make to clear vegetation from a parcel of land. However, blades this large are very heavy and very difficult to manufacture. The size of the blade makes repair and maintenance of the brush-cutting mower expensive and time consuming. Because of the heavy weight of the blade, more than one person is required to remove the blade from the mower. Consequently, either more workmen must be provided at every job site or the operator must wait for help to arrive before necessary repairs can be made. This leads to a significant increase in the cost of operating existing brush-cutting mowers.

Large blades are also exponentially more expensive to manufacture. Consequently, the blade is a relatively expensive component of the brush-cutting mower.

The considerable weight of a large blade also necessitates a significant amount of power to operate the blade. Consequently, relatively heavy and expensive power sources are needed to provide sufficient power to operate the blade. Power sources of this magnitude are exponentially more expensive than smaller power sources. Thus, it is desirable for the blade to be as light as possible to reduce the mower's power requirements while not affecting its ability and durability when cutting from three inch to six inch basal diameter trees.

Using a brush-cutting mower that has a smaller blade and thus a narrower cut path are equally inefficient. When the cut path is narrower than the width of the tractor the mower is attached to, the mower operator must make overlapping passes when clearing vegetation from a parcel of land. While there are considerable savings from operating a smaller blade, these gains are off-set by the increases in the time and cost required to clear the parcel of land.

A need, therefore, exists for a relatively inexpensive brush-cutting mower that can cut a path at least as wide as the tractor to which it is attached, and that can apply treatment fluid to the cut brush and vegetation, preferably in one pass over the cutting path.

Another drawback of existing single blade brush-cutting mowers is the lack of consistent blade exposure. Typically, the housing of an existing brush-cutting mower includes a deck having a clam shell portion. When the brush-cutting mower is not in operation, the deck completely covers the blade. When the brush-cutting mower is in operation, the clam shell portion of the deck is moved away from the blade, and a portion of the blade is exposed. The configuration of the clam shell portion and the circular path of the blade prevent uniform blade exposure for brush to be cut off-center of the forward or rearward path of the axis of the blade. Consequently, existing single blade brush-cutting mowers can be cumbersome to operate and may require multiple passes to obtain equivalent cut-height for a cleared pathway through brush.

Another problem with existing brush-cutting mowers is that the mowers are mounted to the rear end of the tractor. Consequently, the tractor contacts the vegetation prior to the blades on the mower. The weight and force of the tractor typically bends or compresses the vegetation down. As a result, the blade will be unable to cut many of the stems of the vegetation. Therefore, the bent and uncut vegetation will not be cut by the blade as the mower itself passes over the already bent over stem.

Furthermore, because the mower operator faces forward, he has less control over the path of the mower blade. Finally, when the tractor turns the rear mounted mower does not take the same path as the tractor. Numerous problems arise when the tractor path does not correspond to the path of the blade.

Because the tractor encounters the vegetation before the blades can cut the vegetation, the tractor must have sufficient power to run over the vegetation, and to drag a mower blade housing over the brush. Thus, in areas where the brush is particularly thick, the power requirements of the tractor may increase dramatically. Because of the density of the brush is typically unknown in a given job, most existing mowers use large expensive tractors having large horsepower capabilities to perform even the simplest jobs.

In addition, existing mowers may have herbicide spraying capabilities added to the front or rear of the mower, or associated with the mowing blades, but existing blade and spray configurations allow for indiscriminate spraying of treatment liquids onto the outer surfaces of vegetation and onto the ground, requiring spray applications of 20 gallons/acre or more of vegetation sprayed while contributing to "run-off" of excess fluids into streams and lakes.

While turf mowers having multiple blades are known, there are no known brush-cutting mowers that utilize small multiple blades that are belt driven and that have a similar configuration as the present invention, allowing simultaneous application of treatment fluid during cutting of brush and vegetation.

SUMMARY OF THE INVENTION

The present invention is a multiple blade brush-cutting mower for clearing and cutting vegetation and selective application of vegetation treatment fluid into cut pores of vegetation at the time of first cutting for transport throughout the vegetative mass by a natural translocation process. The invented brush-cutting mower is attachable to either the front end or the rear end of a standard tractor. The brush-cutting mower provides consistent blade exposure over an area at least as wide as the width of the tractor to which it is attached. One embodiment, a three blade configuration, clears vegetation efficiently at a substantially lower cost than existing single blade brush-cutting mowers. Further, because the present invention incorporates relatively small lightweight blades, it is easier to perform maintenance on the invented mower. In addition, the multiple blade brush-cutting mower incorporates a treatment fluid dispenser system that applies treatment fluid directly onto the lower surface of each cutting blade, maintains the fluid on the lower surface for simultaneous application of the fluid from each blade at the moment of cutting onto the cut, open ends of the cut vegetation and brush, with the treatment fluid sucked into the vascular system of the vegetation for delivery to the roots of the plants by natural translocation processes, described also as the "Burch effect".

The brush-cutting mower for clearing brush, cutting vegetation, and applying vegetation treatment fluid to cleared land, includes a mower having a convertible deck, the convertible deck having a main deck and a clam shell portion, with the clam shell portion forwardly attachable to said main deck. A distal edge of the main deck, is attachable to the clam shell portion at a radiused proximal edge of the clam shell portion, the claim shell portion extends beyond the radiused distal edge of the main deck. Underneath the main deck, a plurality of spindles are mounted, with one of each of a plurality of cutting blades mounted to each spindle. The mower includes a means for rotating the plurality of cutting blades, and an attachment means for selectively securing the mower to either a front end or rear end of a standard tractor. The mower includes a means for applying treatment fluid from the is lower surfaces of each cutting blade to cut brush and cut vegetation, the applying means administering treatment fluid simultaneously to the cut, open pores of vegetation as the brush and vegetation is cut. The cutting blades form a continuous blade path at least as wide as the width of the mower, with the treatment fluid applied from the lower surfaces of each of the plurality of cutting blades to the cut, open ends of vegetation. The treatment fluid is applied simultaneously from the lower surfaces of the cutting blades at the time of cutting, without application of fluid to the exterior sides of brush and vegetation, nor onto the ground, nor into surrounding air, surface water, or groundwater.

Therefore, a relatively inexpensive brush-cutting mower is provided that can cut a path at least as wide as the tractor to which it is attached, and that can apply treatment fluid to the cut brush and vegetation at the same time as the brush and vegetation is cut, allowing only one pass over the cutting path for cutting and treatment of brush and vegetation.

OBJECTS OF THE INVENTION

Accordingly, an object of the present invention is to provide an apparatus for efficiently cutting and treating vegetation.

A further, and more particular, object of the invention is to provide a multiple blade brush-cutting mower that provides a consistent blade exposure.

Another object of the invention is to provide a brush-cutting mower having a cut-path width as wide as the tractor width.

An additional object of the invention is to provide a brush-cutting mower that can be attached to either the front end or the rear end of a commonly used tractor.

An additional object of the invention is to provide a mower that is easily maintained by adequately trained maintenance crew.

An additional object of the invention is to provide simultaneous delivery of treatment fluid from the cutting blades to cut ends of vegetation as brush and vegetation is cut.

BRIEF DESCRIPTION OF THE DRAWINGS

In view of these and other objects which will more readily appear as the nature of the invention is better understood, the invention consists in the novel combination and arrangement of parts hereinafter more fully described, illustrated and claimed with reference being made to the attached drawings, in which:

FIG. 10a is an exploded side view of the central portion of the central blade spindle;

DETAILED DESCRIPTION

Figure 1:
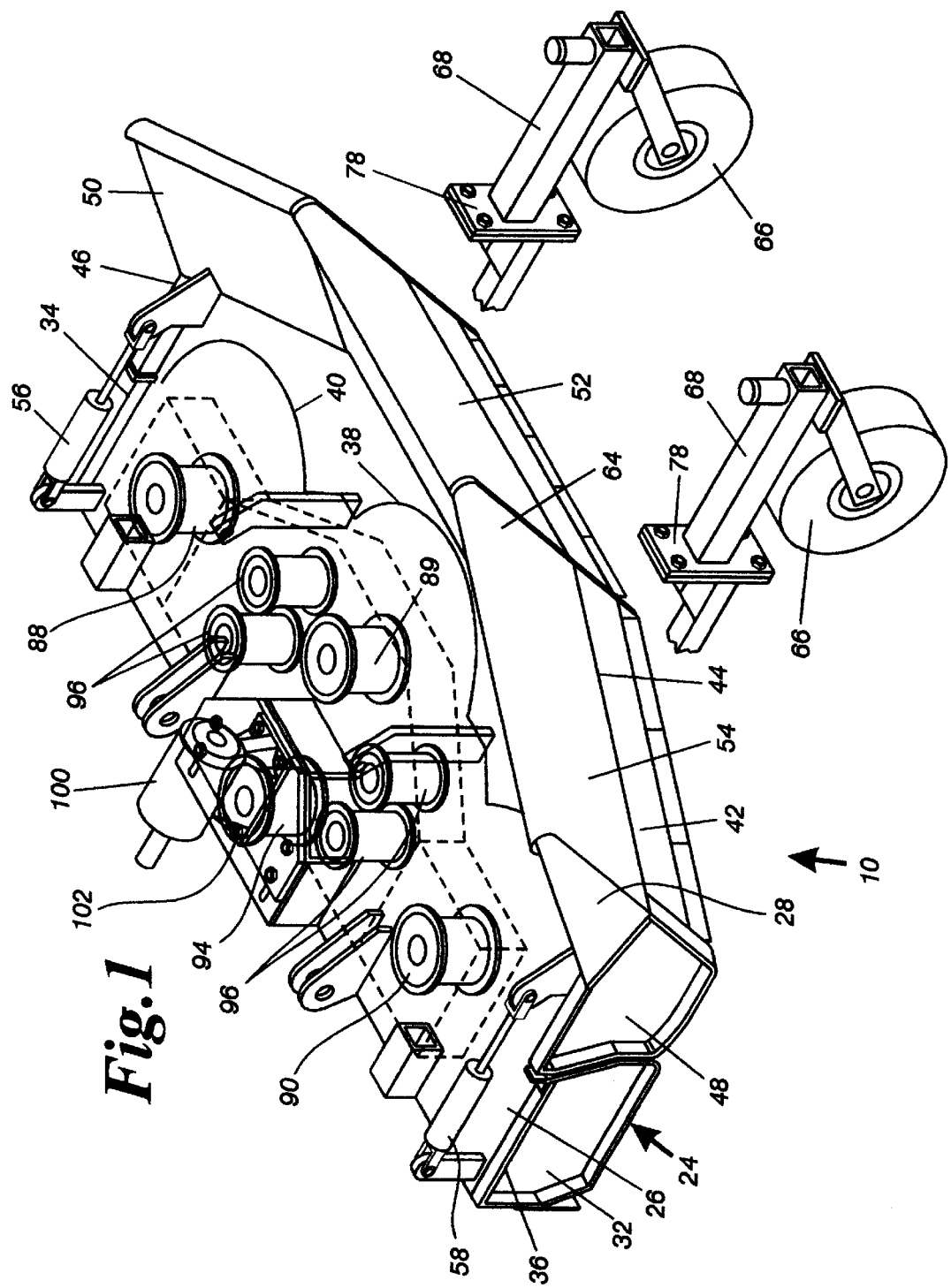
FIG. 1 is an isometric view of a multiple blade brush-cutting mower according to the invention.
Figure 2:
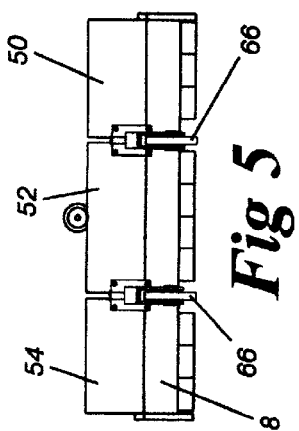
FIG. 2 is a top view of the multiple blade mower.
Figure 5:
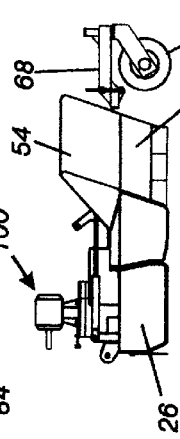
FIG. 5 is a front view of the multiple blade mower.
Figure 3:
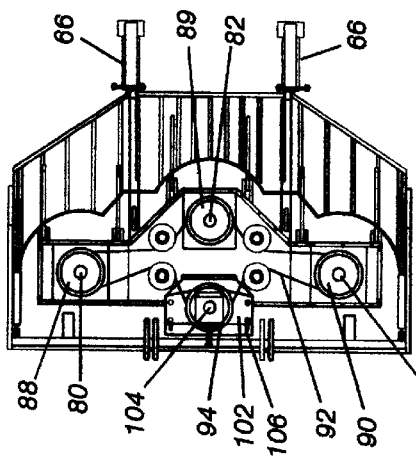
FIG. 3 is a rear view of the multiple blade mower.
Figure 4:
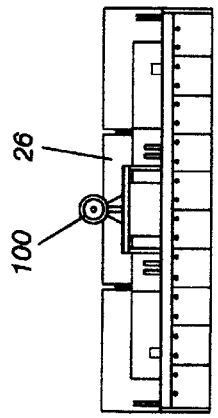
FIG. 4 is a side view of the multiple blade mower.

Referring now to the drawings, FIGS. 1–9 show the invented multiple blade brush-cutting mower 10 for clearing vegetation from a parcel of land, and for applying treatment fluid to cut vegetation at the time of cutting of the vegetation. The invented brush-cutting mower 10 is a unit attachable to either the front end 12 or the rear end 14 of a standard tractor 15. The brush-cutting mower 10 provides consistent blade exposure over an area at least as wide as the width of the tractor 15 to which it is attached. The mower 10 may have as few as one or two pairs of blades, or as many as five, seven, or nine pairs of blades placed across the mower and grouped in mower extension wings (not shown) on either side of the mower 10.

Mower Mechanical Features

Figure 6:
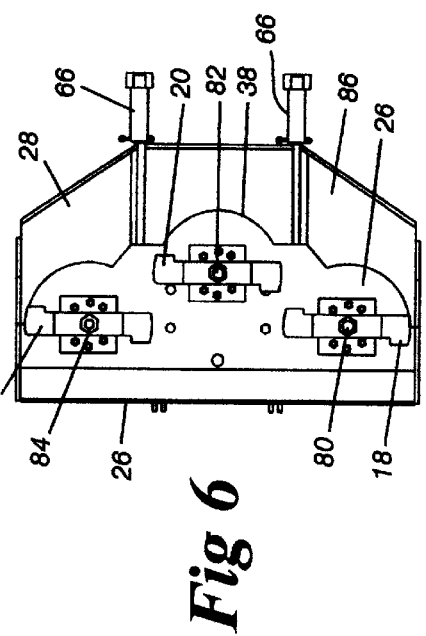
FIG. 6 is a bottom view of the multiple blade mower.

The invented brush-cutting mower 10 includes in one embodiment three pairs of blades 18, 20, 22 mounted under a convertible deck 24 on separate spindles 80, 82, 84 positioned on the underside 86 of the main deck 26 (see FIG. 6). The convertible deck 24 includes a main deck 26, a clam shell portion 28 forwardly mounted to a distal portion 30 of the main deck 26, and a rigid skirt 32 which extends downwardly from the side edges 34, 36 of the main deck 26. The main deck 26 has a distal edge 38 which is radiused. The clam shell 28 has a radiused proximal edge 40 which generally mirrors the distal edge 38 of the main deck 26. The proximal edge 40 of the clam shell 28 extends over the distal edge 38 of the main deck 26. The clam shell 28 also has a continuous flexible safety skirt 42 which extends down from the linked clam shell sections 50, 52, 54 and both side edges 46, 48 of the clam shell 28 (see FIG. 1 and 5).

Figure 7:
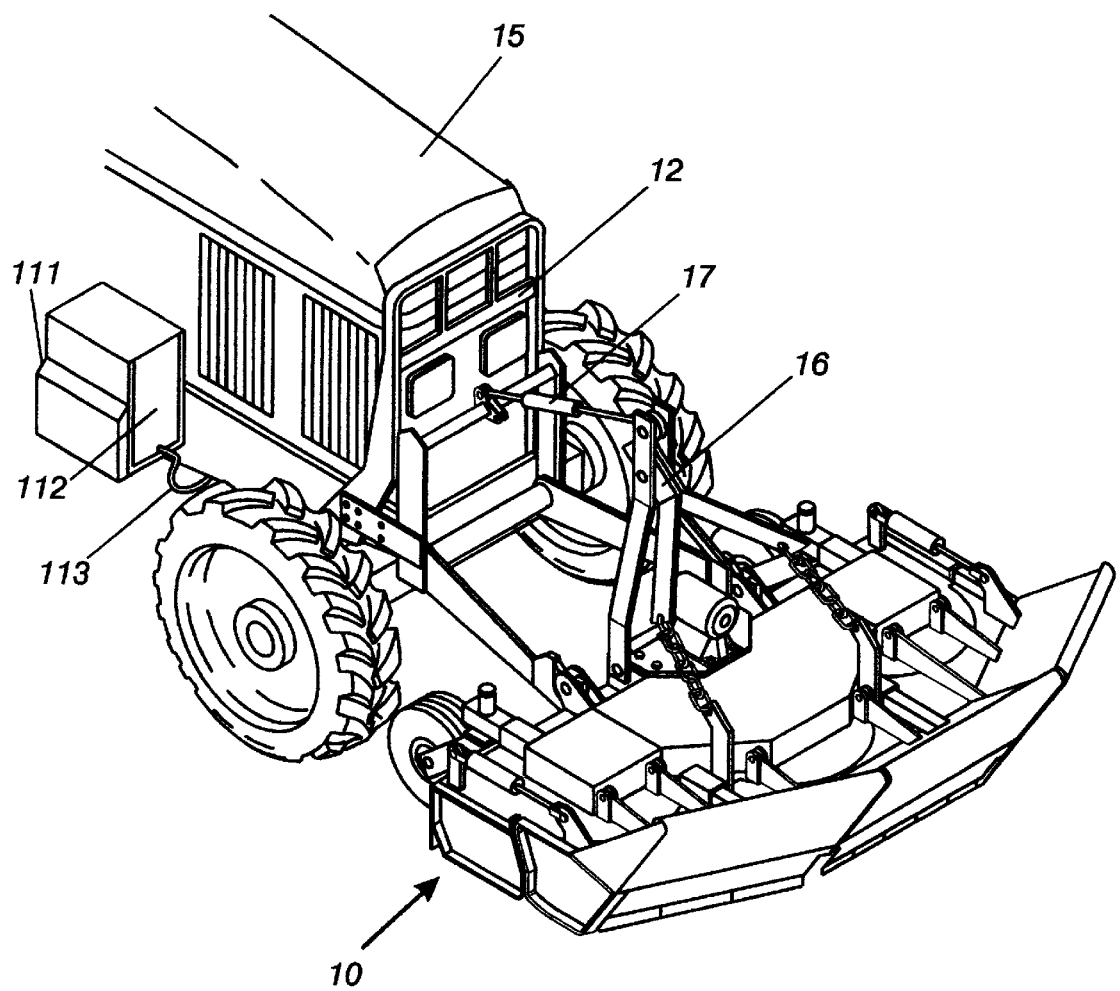
FIG. 7 is an isometric view of the multiple blade mower attached to the front end of a tractor.
Figure 8:
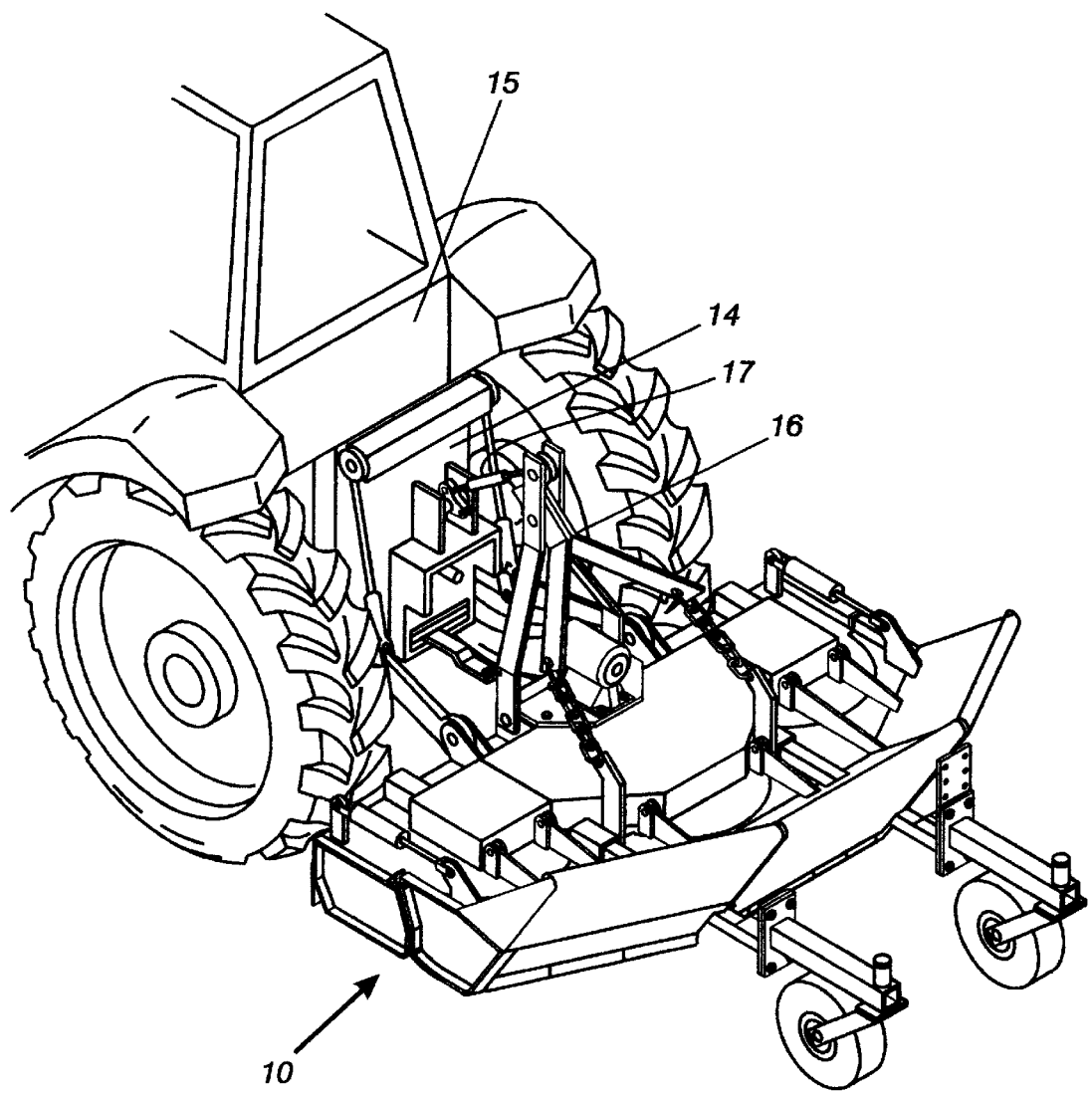
FIG. 8 is an isometric view of the multiple blade mower attached to the rear end of a tractor.

Preferably, the main deck may be positioned at variable heights above the ground, with the three-point hitch 16 connecting between the tractor 15 and the convertible deck 24 (see FIG. 7). The "top link" piston 17 of the three-point hitch 16 is a hydraulic piston that may be adjusted by the tractor operator to tilt, raise and/or lower the mower 10 as the height of the ground and/or brush varies, and to allow field access to the underside of the deck for maintenance. The attachment of the mower 10 to the front end 12 of the tractor 15, is preferred, but the three-point hitch 16 also allows the brush-cutting mower 10 to be attached to the rear end 14 of the tractor 15 if desired, as shown in FIG. 8. Attaching the brush-cutting mower 10 on the front end 12 of a tractor 15 allows the brush-cutting mower 10 to contact the vegetation before the wheels and other parts of the tractor 15. Front-mounting of the brush-cutting mower 10 insures that the blades cut vegetation before the tractor tramples the vegetation. The brush-cutting mower 10 may be moved between the front end 12 and the rear end 14 of the tractor 15 with relative ease, providing flexibility for attachment of the brush-cutting mower. Attaching the brush-cutting mower on the front end of a tractor also provides the operator with a true correlation between the movement of the tractor and the cut path of the blades and allows the operator to have a true perspective of what is being cut, thereby improving the operability of the brush-cutting mower. Finally, front-mounting the brush-cutting mower allows the brush-cutting mower to be operated with a relatively less powerful tractor.

Together, the multiple pairs of blades provide a cutting path at least as wide as the wheel pattern of the tractor. In a preferred embodiment, the pairs of blades each have a diameter of approximately eighty four (84) centimeters (approximately thirty-three (33) inches) and, thus, do not need flying saucer stump guards placed under the bolts for protection as are required for existing "bush-hog" type BURCH WET BLADE®s. The left blade and the right blade are equidistant to the front end of the tractor, and the center blade is positioned equidistant between the left and right blades. The center blade pair is positioned slightly further forward on the main deck than the left or right blades. The center blade pair is partially covered by the front curved clamshell distal edge 38 (see FIG. 1 and 6), with the center blade pair extending forward past the curved clamshell distal edge 38 cover. For cutting of thick vertical brush, or small trees, the clamshell cover may be raised by the twin hydraulic cylinders 56, 58 located on the upper sides of the main deck 26 and attached to 50, left section and 54, right section. The center blade pair may be exposed forward of the mower 10 to allow for cutting into and through a small tree without the need to bend the tree over. Treatment fluid is dispensed onto the cut open pores from lower surfaces of each of the cutting blades, at the moment of cutting, as discussed below.

A spindle pulley is positioned on each of the three spindles. The three spindle pulleys are driven by a single belt for ease of operation and for ease of repair. The driven belt is positioned around the three spindle pulleys and a fourth driver pulley. The driver pulley is spaced from the center spindle pulley and both the driver pulley and the center spindle pulley are positioned equidistant between the left and right spindle pulleys. The driver pulley is proximally positioned with respect to the center spindle pulleys. Four idler pulleys are also preferably included to help guide and control the belt. Preferably, an idler pulley is positioned between each of the four main pulleys. In an alternative embodiment, multiple belts are used instead of just one. The two belts or more belts rotate the spindles such that the blade tip speed is up to approximately 322 kmh (200 mph) from a output of 50 to 75 horsepower. A minimum blade tip speed of approximately 110 mph (177 kmh) is possible with adequate operation of the pairs of cutting blades. The maximum preferred blade tip speed is approximately 5800 meters per minute (19,000 feet per minute), with the minimum preferred blade tip speed of approximately 4570 meters per minute (15,000 feet per minute).

The invented serpentine drive apparatus enables the blades to be operated at an uniform speed. Furthermore, only one power take off is required to operate all three, or more, blades. In a preferred embodiment, the gear box is positioned over the driver pulley and is mounted on a movable mounting plate. The driver spindle is also secured to the mounting plate and is in engagement with the gear box. A U-shaped bracket secures the mounting plate to the main deck. The U-shaped bracket can be removably positioned such that the driver spindle can be positioned at various distances from the center spindle pulley. Thus, when a belt begins to stretch out, the driver pulley can be moved away from the center spindle pulley thereby tightening the belt.

When the invented brush-cutting mower is in operation, the clam shell is moved to an open position in which it provides a consistent blade exposure. When the brush-cutting mower is not in operation, the clam shell is biased in a closed position in which the clam shell completely covers the distal portion of the three rotating blades which are exposed when the clam shell is in the open position. However, when the brush-cutting mower is not in operation, the clam-shell can be opened to expose the cutting chamber and blades for maintenance and repair.

Detailed Embodiment of Mechanical Features

Figure 9:
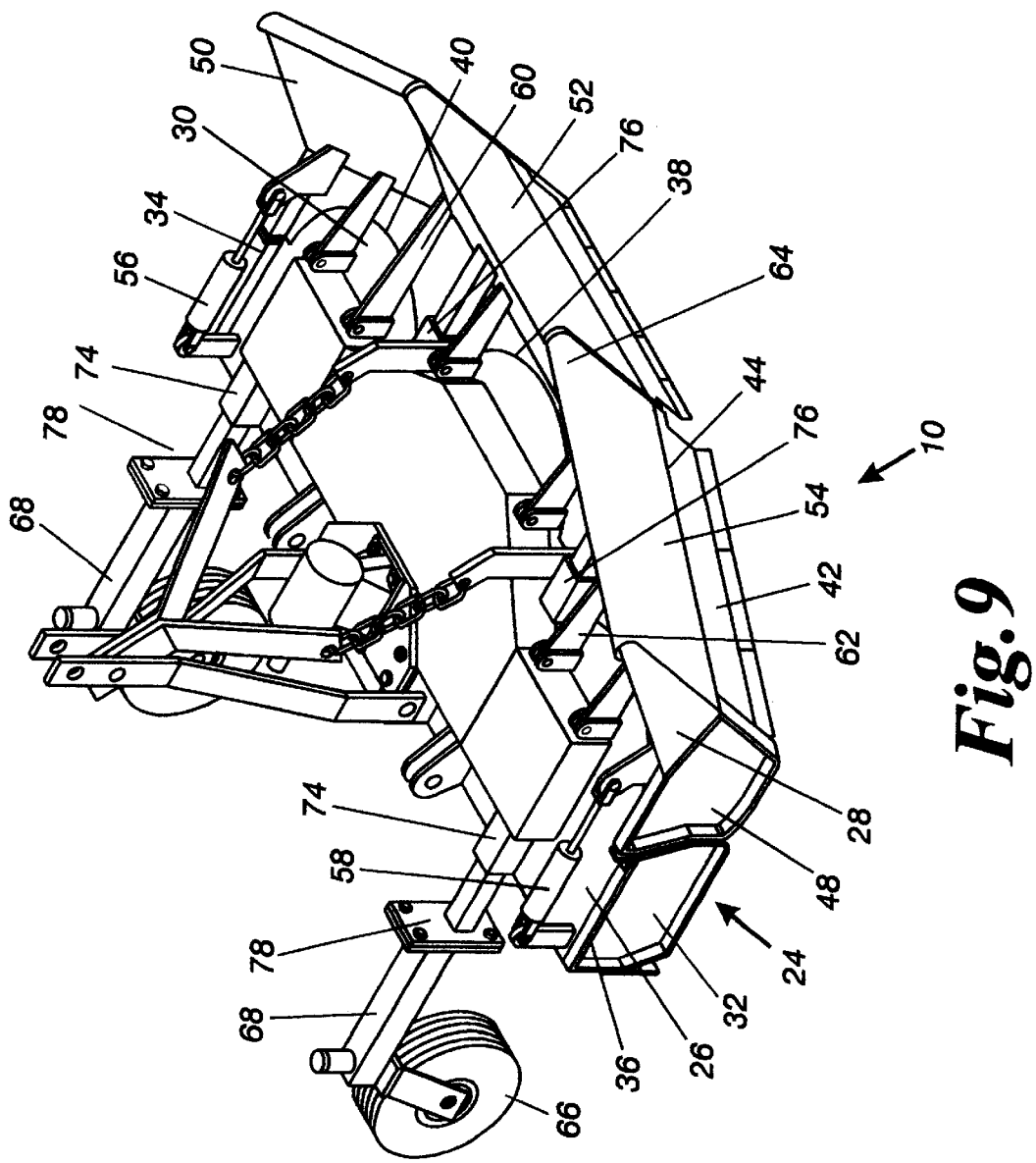
FIG. 9 is an isometric view of another embodiment for wheel placement for the multiple blade mower.
Figure 10:
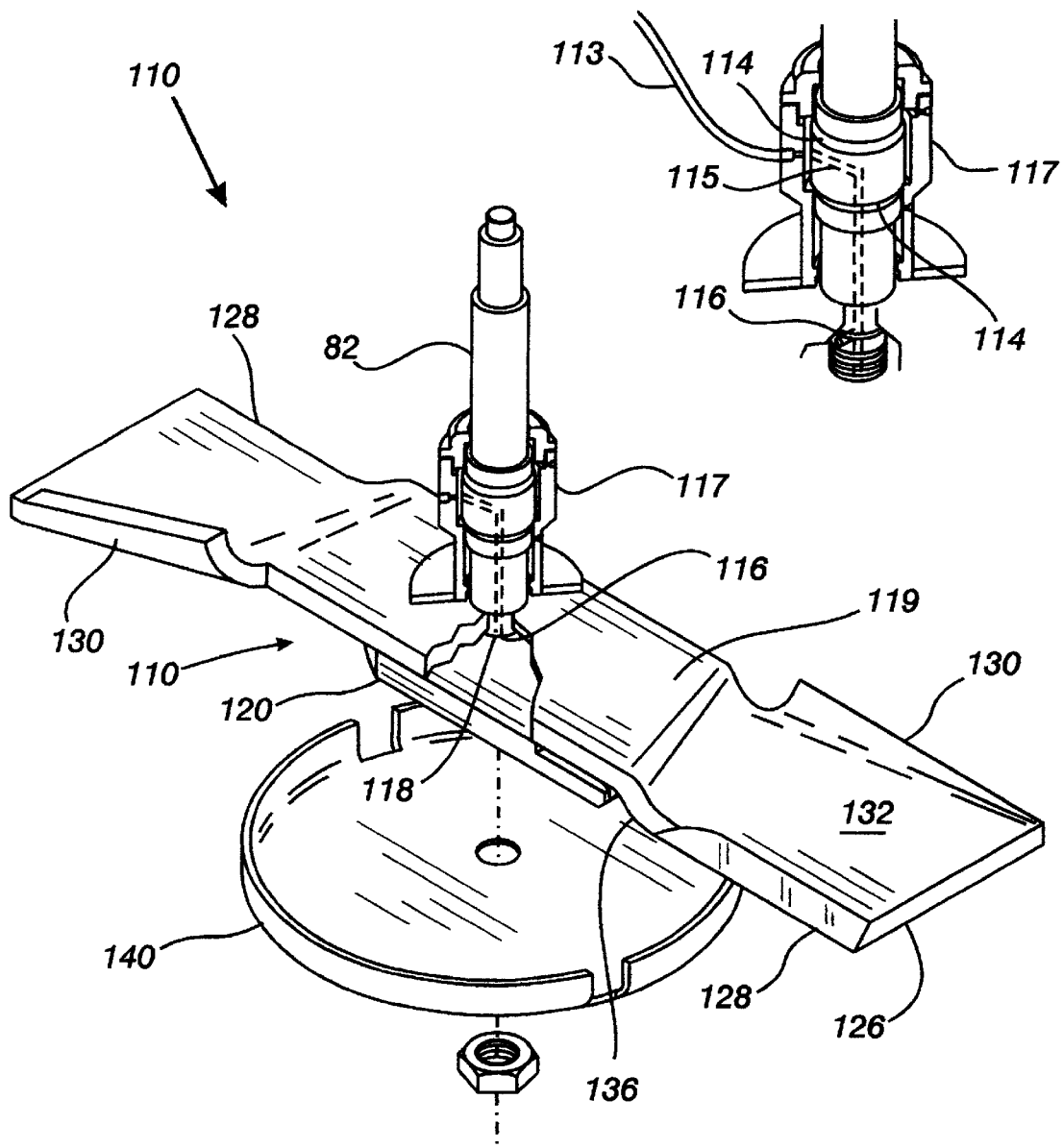
FIG. 10 is a side view of the central spindle, central blade shaft, and the fluid dispenser bar.

Preferably, the clam shell portion 28 is separated into three sections: a left section 50, a center section 52, and a right section 54. The entire clam shell portion 28 is movable and operated with twin hydraulic cylinders 56, 58. A left hydraulic cylinder 56 is positioned between the main deck 26 and the left section 50, and a right hydraulic cylinder 58 is positioned between the main deck 26 and the right section 54. A slave or linkage 60 connects left section 50 to center section 52, and another slave or linkage 62 connects right section 54 to center section 52, and moves the three sections simultaneously between the open and closed positions (FIG. 9). A pushover bar 64 is positioned in a distal portion of the brush-cutting mower 10. The pushover bar 64 uses the forward momentum of the tractor 15 to bend brush downwardly before the blades contact the brush when the clam shell is closed or partially closed (FIG. 9).

In a first embodiment, the invented brush-cutting mower 10 also includes gauge wheels 66 positioned underneath the main deck 26 or mounted on removable extensions 68. The wheels 66 provides additional support and provide blade height adjustment when the brush-cutting mower 10 is operated over uneven terrain. The height of the wheels 66 may be adjusted by the operator, or may be connected to a computer controlled hydraulic draft control, system (not shown) available on many tractors. The "draft control" system utilizes electronic sensors to measure the slip of each drive wheel, and the load on each drive wheel as variable with the irregular surface of terrain, for computer assisted adjustments to the height of the attachment to a tractor, such as height adjustments for a mower in relation to irregular surfaces. The wheel extensions 68 are securable to brackets in the distal and proximal portions of the main deck 26. When the mower 10 is attached to the front end 12 of the tractor 15, the extensions 68 may be secured to proximal brackets 74, and the wheels 66 are positioned behind the brush-cutting mower 10. When the brush-cutting mower 10 is attached to the rear end 14 of the tractor 15, the extensions 68 are preferably secured to the distal brackets 76, and wheels 66 are positioned behind the brush-cutting mower 10. As a result, the wheels 66 can operate without obstructing the cutting path of the mower blades regardless of the orientation of the brush-cutting mower 10 with respect to the tractor 15. Adjustment brackets 78 may be used to adjust the height of gauge wheels 66 with respect to the main deck 26.

The invented brush-cutting mower 10 includes multiple pairs of blades, with one embodiment utilizing three pairs of blades 18, 20, 22 each mounted on separate spindles 80, 82, 84 positioned on the underside 86 of the main deck 26 (FIG. 6). Together, the three blades 18, 20, 22 provide a cutting path at least as wide as the wheel pattern of the tractor 15. In a first embodiment, the blades each have a diameter of approximately eighty-four (84) centimeters (thirty-three (33) inches) and, thus, do not need flying saucer stump guards placed on the bolts for damage protection. The left blade 18 and the right blade 22 are equidistant from the front end 12 of the tractor 15. The center blade 20 is positioned equidistant between the left and right blades 18, 22. The center blade 20, however, is positioned slightly further forward on the main deck 26 than the left or right blades 18, 22. As a consequence, the three blades 18, 20, 22 provide the brush-cutting mower 10 with an unbroken cutting path.

A means for rotating the three blades 18, 20, 22 includes a spindle pulley positioned on each of the three spindles. The three spindle pulleys 88, 89, 90 are driven by a single belt 92 for ease of operation and for ease of repair. The belt is positioned around the three spindle pulleys and a fourth driver pulley 94. The driver pulley 94 is spaced from the center spindle pulley 89 and both the driver pulley 94 and the center spindle pulley 89 are positioned equidistant between the left and right spindle pulleys 88, 90. The driver pulley 94 is proximally positioned with respect to the center spindle pulleys 89. Four idler pulleys 96 are also preferably included to help guide and control the belt 92 (FIG. 1). Preferably, an idler pulley is positioned between each of the four main pulleys. The spindle pulley is in communication by a belt or pulley to each spindle 80, 82, 84, with each spindle attachable to a respective blade, for synchronized rotation of each spindle and each pair of cutting blades 18, 20, 22.

The one-belt drive apparatus enables the multiple pairs of cutting blades 18, 20, 22 to be operated at an uniform speed. The belts absorb shock or short-term delays in power, as created when the tractor and mower traverse rough terrain, with the transfer of constant rotational power transmitted to the multiple rotating spindles, eliminating a slip clutch. Furthermore, only one power take off is required to power the gear box 100 for turning the belts in communication with the multiple blades 18, 20, 22. In a first embodiment, the gear box 100 is positioned over the driver pulley 94 and are mounted on a movable mounting plate 102. A driver spindle 104 is also secured to the mounting plate 102 and is in engagement with the motor and gear box 100. A U-shaped bracket 106 secures the mounting plate 102 to the main deck 26. The U-shaped bracket 106 can be removably positioned such that the driver spindle 104 can be positioned at various distances from the center spindle 82. Thus, when the belt 92 begins to stretch out, the driver spindle 104 can be moved away from the center spindle 82 thereby tightening the belt 92. The belt may be constructed of nylon or rubber with kevlar or other reinforcement, and/or high heat rated materials.

Treatment Fluid Distribution System

The triple blade 18, 20, 22 brush-cutting mower 10 utilizes a treatment fluid distribution system 110 for the storage, transfer, and direct application of various treatment fluids (herbicides, fertilizers, growth regulators, etc.) to vegetation at the initial first cutting. This completely closed fluid treatment system includes three or more spindles 80, 82, 84, and a plurality of pairs of blades connected by a central, generally horizontal, blade shaft 119. Referring to FIGS. 6, 7, and 10–14, the fluid distribution system includes the main components of at least one storage container 112, at least one peristaltic pump (not shown), a constant flow of treatment fluid from the container 112 through tubing to the upper end of spindles 80, 82, 84, conduits for fluid from the spindles into a fluid dispenser bar 120 for each pair of blades, and exit ports (two) for each bar 120 that place treatment fluid near the leading edge of the lower surface of each pair of blades. Each fluid dispenser bar 120, known as the BURCH WET BLADE® system (FIGS. 10–14), is attachable underneath and parallel to a respective central blade shaft 119. Each dispenser bar 120 is protected from flying objects, stationary rocks, and stumps by a lower cover plate 140, or "stump guard" that fits over the dispenser bar 120 and the central portion of the central horizontal blade shaft 119.

As the pairs of blades 18, 20, 22 cut the stems of the vegetation or brush, the fluid treatment system simultaneously applies a treatment fluid from the lower surface of each cutting blade to the cut, open stem ends at the fleeting moment of the first cutting of stems as the stems travel across the wet lower surfaces of each of the cutting blades 18, 20, 22. Applying treatment fluid at the exact moment that the integrity of the stems are breached, allows placement of fluid into the cut pores of the translocation system of vegetation as the downward force of gravity pulls the internal fluids of the plant down into the plant, therefore the treatment fluid is sucked immediately into the pores and internal cells of the vascular system of the plant. The method of application of treatment fluids by the invented treatment fluid application system provides for application of treatment fluids at the time of initial cutting into the pores of the vascular system of vegetation with quick delivery of fluids to the roots of plants, without wastage of treatment fluids from excess application to the ground, or the exterior surfaces of plants.

Detailed Embodiment of Fluid Distribution System

In a first embodiment, the invented multiple blade brush-cutting mower utilizes a fluid treatment system 110 for the direct application of various treatment fluids (herbicides, fertilizers, growth regulators, etc.) into the cut ends of vegetation, the fluid treatment system includes storage, transfer, and the BURCH WET BLADE® system. The BURCH WET BLADE® system dispenses fluid from a fluid dispenser bar 120 near each cutting edge and onto the lower surface of each cutting blade 18, 20, 22. The treatment fluid is taken up, and absorbed into each cut, open end of vegetation and brush at the moment of initial cutting, when the vegetation is in contact with the lower surface of each cutting blade. The treatment fluid applied from each blade is applied at the instant of first cutting, to only the cut open pores of the vegetation. During the fleeting moment after first cutting, the applied treatment fluid is sucked down into the exposed cut pores of the vegetation stems and into the vascular system of a plant, thereby allowing the rapid distribution of treatment fluid throughout the plant and into the roots of the plant, avoiding past practices of only superficial application of herbicides and pesticides to the exterior surfaces of vegetation or wiping on after vegetation is cut. The BURCH WET BLADE® system provides for the placement of fluids into the cut open ends of vegetation, without dispensing fluid onto the outer uncut surfaces of vegetation, and without dispensing fluid onto the ground around cut vegetation. The lack of broad application of treatment fluids reduces wastage, reduces groundwater contamination and treatment fluids runoff into surface water, and minimizes use of fluids in the range of about 0.94 liters/acre (0.25 gallons/acre) to about 4.73 liters/acre (2.5 gallons/acre). If approximately 95% of the applied treatment fluids are water, with approximately 5% being active toxic ingredients, the actual application of toxic chemicals is reduced well below manufacturer's suggested spray rates for foliage application of actual toxic chemicals per each acre, calculating from the higher rate of application of approximately 7.57 to 9.46 liters (2 to 2½ gallons) of treatment fluids applied per each acre mowed.

The fluid treatment system includes a reservoir of treatment fluid stored in recyclable containers 112 positioned in a magazine 111 preferably mounted on the tractor 15. The containers include at least two FLO-THRU CELLS™ 112, 112' so that the level of the treatment fluid does not fall below the level of the outlet of the lowermost cell regardless of the orientation of the cutting blades of the mower relative to the FLO-THRU CELLS™ 112, 112'. The use of a plurality of FLO-THRU CELLS™ 112, 112' permits an area to be treated at one time which would otherwise be too large to be correctly treated with a single fluid container cell. Further, the use of a plurality of FLO-THRU CELLS™ 112, 112' permits a large area to treated at one time without the need to repeatedly discontinue the cutting and treating operation to refill a single large fluid treatment container. Instead, the upper FLO-THRU CELLS™ 112, 112' may be readily removed and replaced with additional pre-filled cells without washing or rinsing. The empty FLO-THRU CELL™s are recyclable and refillable and once empty, are returned eliminating disposal by normal means.

The reservoir of treatment fluid, namely a plurality of recyclable containers 112, and 112' (FIG. 13), includes the following features: an inlet port 142, an outlet port 144, a shutoff fitting (not shown) for each port, a fill opening in the top of the container. A breather cap 145 is connected to a conduit attached to the top most inlet port permitting an equal volume of air to replace the liquid as it is dispensed or "flows through" the stack of cells. The multiple ports 142, 144 provide for interconnecting of a plurality of tubing leading to additional containers 112' with the shutoff fitting (not shown) providing for the cutoff of flow from one container, while other containers 112 continue to feed treatment fluids to the fluid dispenser bar 120. The breather cap 145 provides for ambient air to enter the fluid container 112, so that a partial vacuum does not develop and inhibit flow of treatment fluid as the pump (not shown) extracts treatment fluid from the container 112. The use of a plurality of magazines loaded with a plurality of FLO-THRU CELLs 112, 112' allows for different herbicides, fertilizers, growth regulators, etc.), to be loaded into separate containers, with interconnecting of the conduits to the pump, to provide the operator of the tractor and controller of the fluid treatment system 110 to mix and match multiple treatment fluids depending on the type of vegetation or brush that is being cut and treated simultaneously. The interchangability of the recyclable, reusable, and refillable containers 112 may have applications in additional fields where different fluid solutions from separate cells are then mixed together. The interchangability of the containers 112 allows for fluids to not be mixed together until the time of application, which extends the shelf-life of prepackaged fluids, when mixing to form a more active treatment liquid is delayed until immediately before the application of the treatment liquids. The containers 112, 112' may be generally rectangular, or square, with rounded corners, and two extensions on one end, to allow for stacking of the containers two, three, or more containers high (see FIG. 13).

The fluid treatment system 110 also includes a peristaltic pump (not shown) that accurately meters the ultra-low volume delivery of treatment fluid. Pump comprises any type of variable capacity pump for pumping widely varying amounts of the treatment fluid depending on the speed of the mower over the surface of the ground, as will be described. Preferably, however, pumping means 150 is a peristaltic pump of the type available from TAT Engineering of Branford, Conn., which pumps the treatment fluid through fluid conduits via waves of contraction of the pumping means 150 at a pressure of approximately 3.54 kg/cm$^2$ (5 psi) produced mechanically by a series of rollers compressing the flexible tubing containing the treatment fluid. Fluid transfer hoses move fluid from the storage container to the spindles 80, 82, 84, with the hoses made of flexible rubber tubes (not shown) or of soft polyvinylchloride (PVC).

The pump delivers the treatment fluid from the FLO-THRU CELLS™ 112 by fluid transfer hoses 113 to a central fluid intake opening 115 for each spindle 80, 82, 84. The intake opening is spinning with the rotating spindle, and the rotating spindle is surrounded by a stationary spindle collar or housing 117 having two middle rotational seals 114 within the interior of the spindle collar 117 forming a pocket. Fluid is transferred into the pocket between two middle seals 114 from hoses 113, with the fluid transferring across the gap between the interior of spindle collar 117 and the midsection of the rotating spindle, into a central fluid intake opening 115 in each spindle 80, 82, 84. The central fluid intake opening 115 accepts fluid as contained by the pocket between the middle rotational seals 114, for continued transfer of treatment fluid down each spindle to an exit opening 116 in the spindle shaft side connectable to a central opening of the fluid dispenser bar 120, without interacting with the lubrication used to facilitate the rotational motion of the spindles in the supporting collar or housing 117. Each spindle has an interior conduit that transports fluid to the lower end of each spindle shaft which transfers fluid to the sloped section (25°) of the angled junction 136 of the central blade shaft 119, which connects with the fluid dispenser bar 120. The middle rotational seals 114 may be a rubber seal (not shown), or other seal utilized to seal a part rotating around a stationary enclosure or housing 117.

The treatment fluid moves down through each spindle by interior conduits to at least one exit opening 116 at the lower end of each spindle. The spindle shaft is connectable at the lower, distal end of the spindle shaft, through the central, preferably square, opening of the central blade shaft 119, into the central opening of the fluid dispenser bar 120. As the spindle rotates in conjunction with the generally horizontal central blade shaft 119, the fluid dispenser bar 120 is located underneath each central blade shaft 119 and bar 120 rotates in concert with shaft 119. The treatment fluid exits from at least one exit opening 116 of each spindle, into a central fluid circular groove or pocket 118 within the central cylindrical or square hole of the dispenser bar 120 (see FIG. 10 and 11).

The central fluid circular groove or pocket 118 includes a cylindrical or square gap (not shown) that encircles the exit openings 116 of the spindle when the spindle is inserted into the fluid dispenser bar 120. The groove or pocket 118 is in fluid communication with channels 122, 122' radiating outward from the central part of dispenser bar 120. The fluid moves from the exit openings 116, across the gap into the central groove or pocket area 118, through the channels 122, 122', through the respective tubing in each channel, and out toward the opposing corners of the parallelogram shaped, or rectangular shaped, dispenser bar 120, via tubing 123 in each bar 120, to the exit ports 124, 124' that are oriented underneath the cutting/leading edge 128 of the lower surface 126 of each respective cutting blade 18, 20, 22 (see FIGS. 11 and 12). The tubing 123 in channels 122 is approximately 3/16 inch inside diameter, and approximately 6.35 millimeter (1/4 inch) outside diameter. The outlet or exit port 124 on each dispenser bar 120 is approximately 4.75 millimeter (3/16 inch) diameter. Each exit port 124, 124' is oriented within approximately 12.7 millimeter (0.5 inch) distance inward, or recessed toward the central groove or pocket area 118 of the bar 120, from the lower angled surface of the junction 136 of the blade and the leading edge 128 of the lower 126 surface of each blade (see FIGS. 10 and 12). The distance inward may be approximately 9.5 millimeter (0.375 inch) to approximately 15.875 millimeter (0.625 inch), with 12.7 millimeter (0.5 inch) distance preferred for proper placement of fluid from each port to lower 126 surface.

The exit ports 124, 124' are also oriented approximately in the range of approximately 9.5 millimeter (approximately 0.375 inch) to approximately 15.875 millimeter (approximately 0.625 inch) inward, to approximately 31.75 millimeter (1.25 inch) back, and preferably 25.4 millimeter (1.0 inch) back, from the leading edge 128 of each blade (see FIG. 12), to allow the distribution of the released treatment fluid to spread across the lower 126 surface of each blade without the treatment fluid spreading over the front of the leading edge 128, limiting the treatment fluid to only the lower 126 surface and not on the upper 132 surface of the blade. The exit port 124 releases treatment fluid toward the lower 126 surface, and the treatment fluid moves to, and across the approximately 12.7 millimeter (0.5 inch) gap underneath the lower angled surface of the junction 136 of the blade, toward the leading edge 128 due to aerodynamics and air movement around the blade. The aerodynamics within approximately 12.7 millimeter (0.5 inch) gap area is determined as a function of the angle of the junction 136, which is optimally 25 degrees, and the blade leading edge velocity, which is maintained in the range of approximately 5800 meters per minute (19,000 feet per minute) and approximately 4570 meters per minute (15,000 feet per minute).

Due to the configuration of the upper surface 132 and lower surface 126 of each cutting blade, and the angled junction 136 of the blade with the central blade shaft 119, an airfoil effect is created for each cutting blade as the blades rotate. Similar to an airplane wing, the upper surface 132 has an upwards curvature from the leading edge 128 to the upturned rear surface 132 of trailing edge 130 of each blade. As air moves across the upper 132 and lower 126 surfaces, a differential air pressure area is created across the lower 126 surface of each blade, partially dependent on the angle of the angled junction 136 leading to the lower 126 surface. As treatment fluid is released from each exit port 124 of fluid dispenser bar 120, the treatment fluid spreads out over the cutting/leading edge 128, lower surface 126, and the fluid spreads out across the main surface area of lower 126 surface of each blade. The fluid remains on the lower 126 surface of each blade for a length of time dependent on the amount of lower surface air pressure created by the speed of the blades, the angle of the angled junction 136, the size of gap (approximately 0.5 inch), and the difference between the larger surface area of the upper 134 and lower 126 surfaces of each blade. A preferred angle of the angled junction 136 is in the range of approximately 24.5° and approximately 25.5°, ideally approximately 25° for optimal distribution of fluid across the lower surface of each blade. The preferred range of blade tip speed is approximately 4570 meters per minute (15,000 feet per minute) to approximately 5800 meters per minute (19,000 feet per minute), or approximately 177 km/hr (110 mph) to approximately 322 km/hr (200 mph).

With the treatment fluid remaining on the lower 126 surface of each blade, as the individual cut vegetation stems 146, cut brush, and/or cut small trees move across the lower 126 surface of each blade, the treatment fluid is simultaneously applied onto and absorbed directly into the cut and open ends of the vegetation, without wastage of treatment fluid onto the uncut sides of vegetation, nor on the ground or in surface water around the vegetation. Therefore the treatment fluid is applied to the cut and exposed interior vertical oriented pores of the vegetation, permitting rapid movement of treatment fluid down through the vegetation to the roots of the vegetation, as proven in field tests with operation of the mower, plurality of cutting blades, and fluid dispenser bar.

The efficiency of the fluid treatment system is demonstrated by the sparing use of treatment fluids, from approximately 0.946 liter/acre (0.25 gallons/acre) to approximately 9.46 liter/acre (2.5 gallons/acre) of treatment fluid for a total disbursement of fluids from all of the cutting blades for each acre of vegetation cut. Normal usage by a spraying or a drip-dispensing mower currently used in the industry is in the range of 75 liters/acre (20 gallons/acre) or more of fluid per each acre treated.

It is demonstrated that the constant replenishment of the treatment fluid on the lower surface of each blade, and the availability of the fluid for applying to cut stems 146 at the moment that the vegetation is initially cut is critical to the efficiency of the treatment. The air flow across the lower surface creates a pressure differential, in relation to the air flow across the upper surface of the blade since the upper surface having more surface area, therefore maintaining an area of pressure differential along the lower surface which holds the treatment fluid onto the lower surface after discharge from the fluid dispenser bar's outlet ports as the blades rotate. As a film of treatment fluid is maintained across the lower blade surface, the cut ends of brush and vegetation are either in contact with, or in close proximity with the lower blade surface, with the treatment fluid applied to the cut exposed interior vertical pores of the cut stems 146 of the vegetation at the moment that the vegetation is initially cut. The transfer of fluid to the cut stems occurs regardless of the speed of rotation of the cutting blade, or the ground speed of the mower, or the orientation of the cutting blade relative to the FLO-THRU CELLS™. Accordingly, the treatment fluid is absorbed into the interior vertical pores of the plants when vegetation is initially cut by the cutting blade. Also, no wastage of treatment fluid occurs, because the fluid is not sprayed or wasted by excess application on the ground or on the exterior, uncut surfaces of vegetation or brush.

Figure 11:
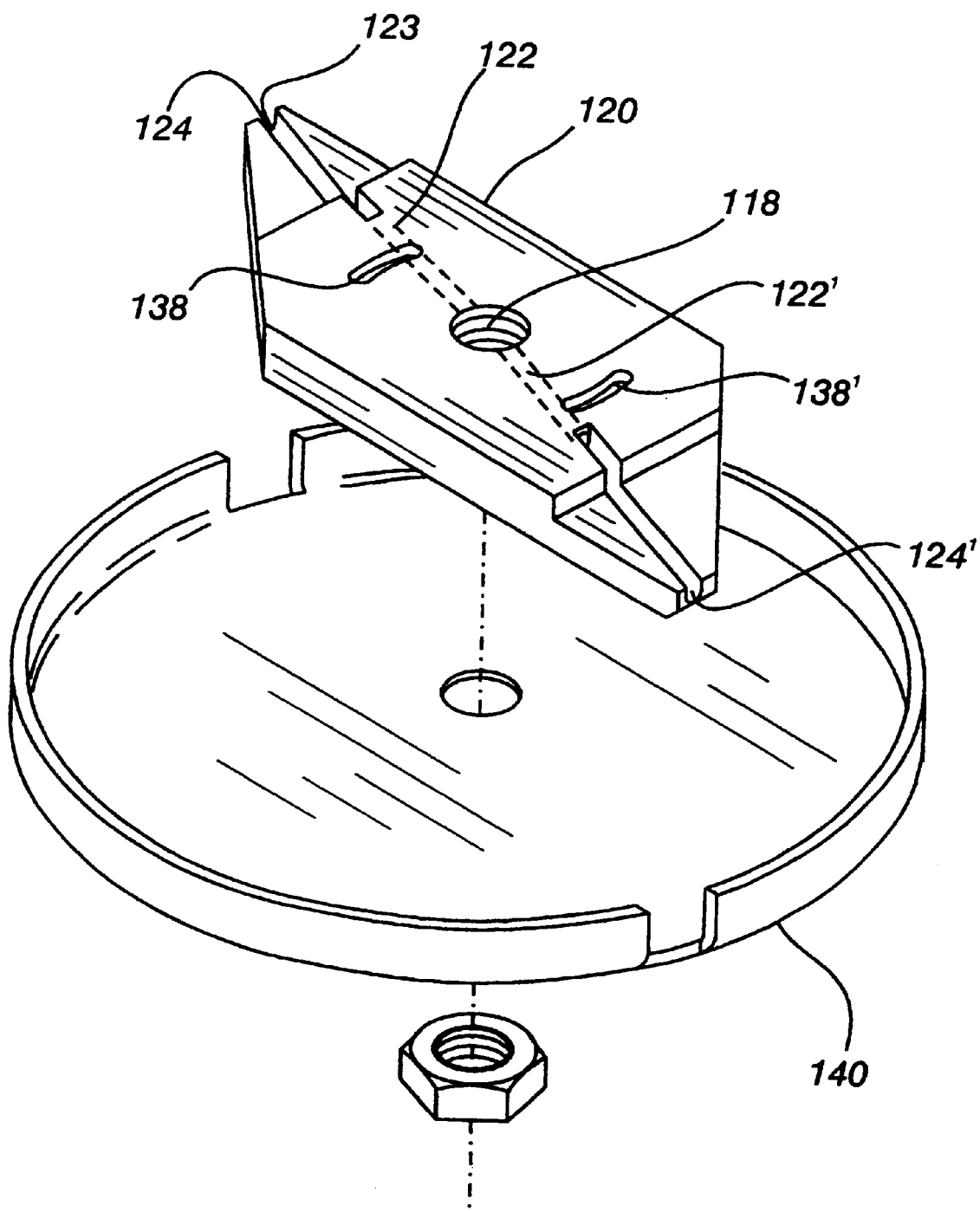
FIG. 11 is a top view of the fluid dispenser bar.
Figure 12:
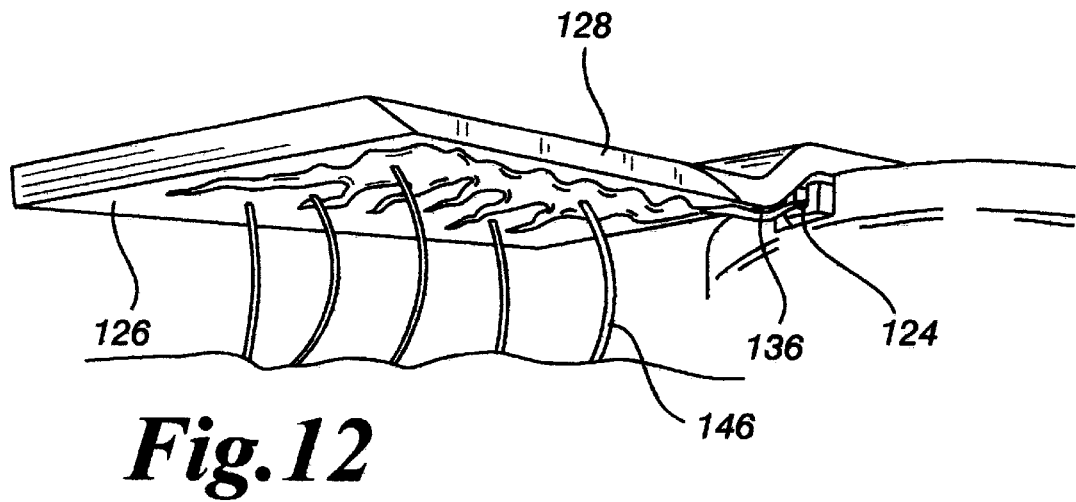
FIG. 12 is an elevation lower view of a cutting edge of a blade.
Figure 13:
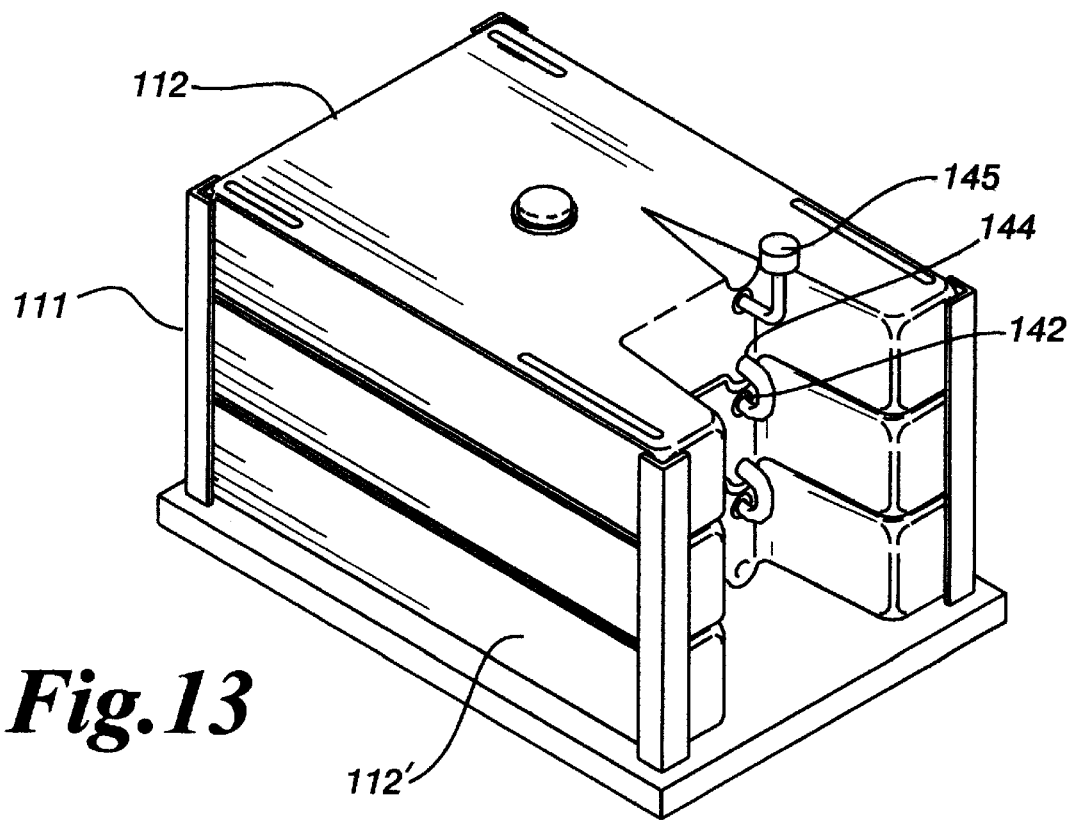
FIG. 13 is a perspective view of stacked recyclable containers of the fluid distribution system of the present invention.
Figure 14:
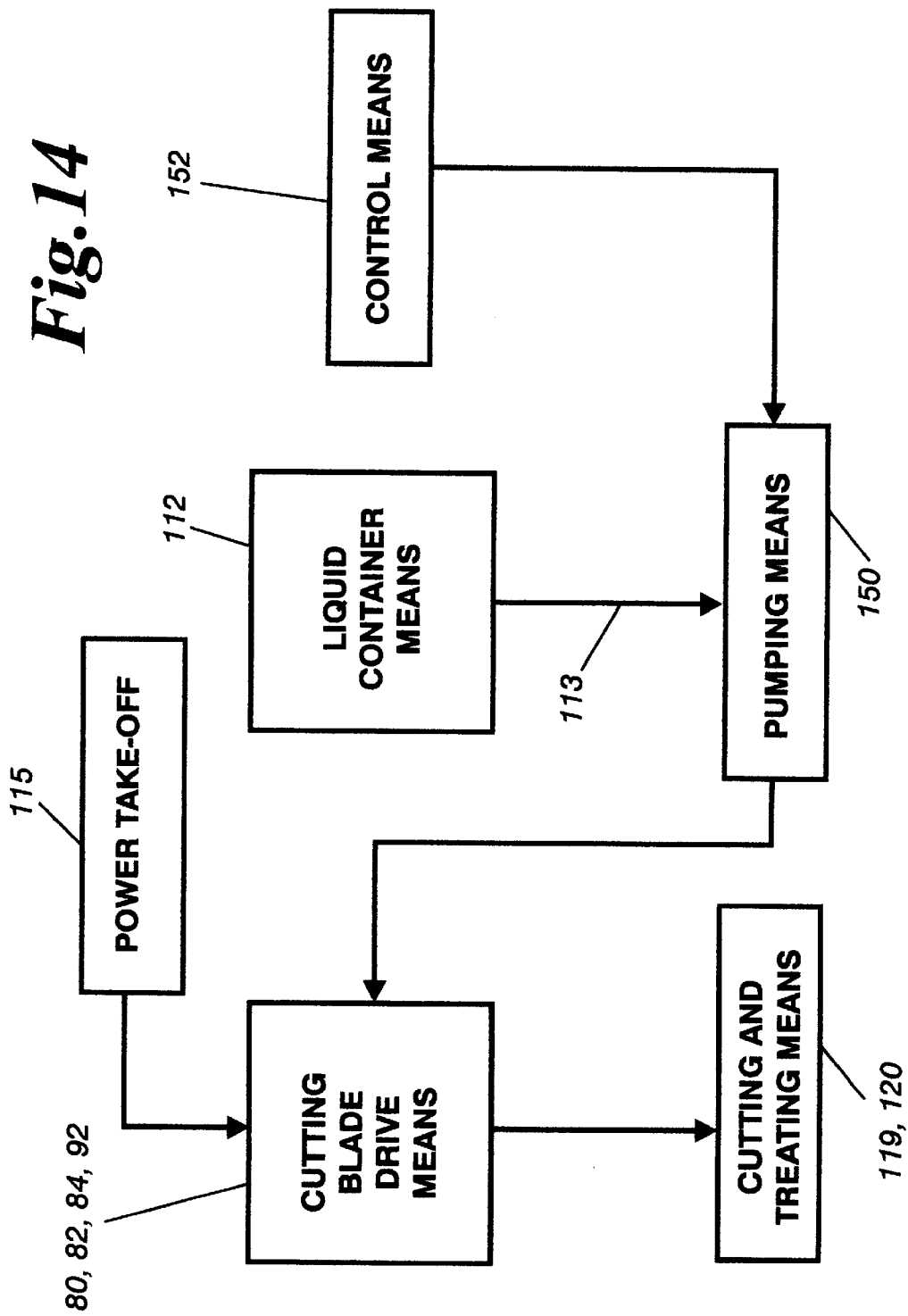
FIG. 14 is a flow diagram of the fluid storage, transfer, and distribution system of the present invention.

Each fluid dispenser bar 120 is adjustable so that as the blades are worn down from use, with resulting erosion of cutting edges, the dispenser bar 120 can be turned or pivoted so that they are aligned with, and continue delivering treatment fluid to the leading/cutting 128 edge of the lower 126 surface of each of the blades. The adjustment mechanism is an adjustment opening or groove 138, 138' in each side of the central blade shaft 119, as shown in FIG. 11. The ability to loosen bolts, and pivot the dispenser bar 120 within the limits of the adjustment groove 138, 138', allows for continued use of the dispenser bar 120 and cutting blades even as the cutting edge 128 is worn, to delay the replacement of each cutting blade.

The fluid treatment system can be selectively operated by the operator, or automatic distribution of treatment fluid may be controlled by control means 152 such as computer software that monitors the rate of travel of the tractor, the velocity of blade rotation, the amount of treatment fluid to be administered per blade, and the combination of treatment fluids and fertilizers to be mixed and administered. A single cell 112 may also be utilized if it is desired to apply a predetermined number of FLO-THRU CELLS® containing the same treatment fluid or a suspension of particles in fluid to an area, or if it is desired to apply different treatment fluids to the same area. For example, a first FLO-THRU CELL™ pre-filled with a fluid crabgrass herbicide treatment may be used to simultaneously apply crabgrass herbicide to the remaining stems of the vegetation at the same time that the vegetation is cut. Additional FLO-THRU CELL™S may be mounted on the tractor to multiple fluids for mixing and for flushing fluid conduit lines. The FLO-THRU CELL™ containing the cleansing solution may then be removed and replaced with additional FLO-THRU CELL™ containing a fluid fungicide. The height of the cutting blades 18, 20, 22 above the surface of the ground may be adjusted and lowered to expose the remaining cut stems to the cutting blades, and the herbicide or fungicide is applied as the vegetation is cut again.

Flow control means 152 comprises a control unit which is preferably powered by a power source from the tractor, such as 12 volt battery. The control unit of flow control means is electrically coupled to a ground speed detection means preferably located on the rear axle of tractor adjacent each wheel.

The fluid treatment control unit includes gauges that enable the operator to visually confirm the flow of fluid to the cutting blades. The fluid treatment system includes a speedometer connected to the pump. A gauge mounted in the tractor cab and connected to the speedometer indicates to the operator whether or not the pump is operating properly. The fluid storage, transfer, and treatment system also includes a gravity switched flow indicator (not shown) connected to the fluid lines. A gauge mounted in the tractor cab indicates to the operator whether or not fluid is flowing through the fluid lines.

A method for clearing brush and cutting vegetation from land utilizing a brush-cutting mower is inherently disclosed, including the steps of providing a mower, the mower having a self-propelled tractor attachable to the mower, attaching a plurality of cutting blades to the mower, and rotating the plurality of cutting blades during operating of the mower, with power provided to the mower by the self-propelled tractor. As the cutting blades are rotated during the rotating step, a simultaneous step of pumping vegetation treatment fluid through the rotating cutting blades occurs, with the amount and frequency of pumping of treatment fluid controllable by the operator of the self-propelled tractor. As the vegetation treatment fluid is pumping to, and over the lower surfaces of the plurality of cutting blades, the blades are cutting brush and vegetation, with the step of applying vegetation treatment fluid on cut brush and vegetation occurs simultaneously with the cutting step. As the vegetation treatment fluids are pumping to, and over the lower surfaces of cutting blades, at least one peristaltic pump is accurately metering ultra-low volumes of treatment fluids for direct and simultaneous applying to the cut ends of the brush and vegetation exposed to the cutting blades. Therefore, the method of clearing brush and cutting vegetation provides for simultaneous cutting with three pairs of blades as vegetation treatment fluids are applied to the cut open ends at the time of initial cutting, providing for highly effective application of treatment fluids into the vascular system of plants without over-spraying of treatment fluids onto the ground, into the air, or into surface waters.

ALTERNATIVE EMBODIMENTS

The above described brush-cutting mower 10, having a mower deck that may be attachable to either the front or the rear of a tractor 15, may have one or more "bush-hog" like blades underneath the mower deck, in place of the three pairs of blades 18, 20, 22 as described above. The "bush-hog" like blades are composed of a middle blade support section connected to a centrally connected rotatable spindle, with a lower cover plate 140 underneath the centrally connected spindle. Each opposing end of the middle blade support section has connected to the end, by a bolt, a swiveling blade that extends outward from each opposing end, and swivels while the middle blade support section rotates. Underneath each of the attaching bolts for each opposing end is located a "flying saucer" round shaped fluid dispensing bar of the BURCH WET BLADE® system. Fluid is transferred from the centrally connected spindle, through tubing conduits in the middle blade support section, to each round shaped fluid dispensing bar. The round shaped fluid dispensing bar has at least one outlet for treatment fluid to be applied on the lower surface of each swiveling blade, similar to the application of treatment fluid from the fluid dispensing bar 120 of the preferred embodiment. As the swiveling blade swivels and cuts vegetation, brush, and small trees, the treatment fluid on the lower surface of each blade is applied at the instant of cutting to the cut open pores of the vegetation. During the fleeting moment after cutting, the applied treatment fluid is sucked down into the exposed cut pores of the vegetation stems and into the vascular system of a plant, thereby allowing the rapid distribution of treatment fluid throughout the plant and into the roots of the plant, avoiding past practices of only superficial application of herbicides and pesticides to the exterior surfaces of vegetation. Significantly less treatment fluids are dispensed with improved control of vegetation and less frequency of mowing.

An additional embodiment includes a hydraulic drive means including a hydraulic pump located on the tractor 15, and a hydraulic motor attached to and driving the input shaft of the right angle gear box 100 providing hydraulic drive power to the driver pulley 94, thereby driving the one-belt drive apparatus. The hydraulic motor is connected to the hydraulic pump by high pressure lines anchored to a structure such as the three-point linkage or a boom arm, and the hoses may flex as the boom arm or other linkage is manipulated.

SUMMARY OF THE ACHIEVEMENT OF THE OBJECTS OF THE INVENTION

From the foregoing, it is readily apparent that I have invented an apparatus for efficiently cutting brush and vegetation, with simultaneous application of treatment liquids to the cut ends of brush and vegetation as the multiple blade mower operates. The invented apparatus is a relatively inexpensive multiple blade brush-cutting mower that provides a consistent blade exposure. The brush-cutting mower can be attached to either the front end or rear end of a standard tractor and provides a cut path width at least as wide as the width of the tractor. The invented brush-cutting mower is more easily maintainable and repairable than a single blade mower of equal cutting width. The invented brush-cutting mower and treatment fluid application apparatus and method provides for efficient application of vegetation treatment fluids without wastage of treatment fluids onto the ground or onto the exterior sides of vegetation.

It is to be understood that the foregoing description and specific embodiments are merely illustrative of the best mode of the invention and the principles thereof, and that various modifications and additions may be made to the apparatus by those skilled in the art, without departing from the spirit and scope of the appended claims.

What is claimed is:

1. A mower for cutting vegetation and applying vegetation treatment fluid at a first cutting to cut brush and vegetation, comprising:

a mower having a convertible deck, said convertible deck having a main deck and a movable portion, said movable portion being forwardly attachable to said main deck;

a distal edge of said main deck, said movable portion attachable to said distal edge at a proximal edge of said movable portion, said movable portion extending beyond said distal edge of said main deck;

a plurality of rotatable spindles mounted to the underside of said main deck;

a plurality of pairs of cutting blades, each of said pairs of cutting blades connected to respective central blade shafts, each of said shafts mounted respectively to each one of said plurality of rotatable spindles;

means for rotating said plurality of pairs of cutting blades;

a means for securing the mower to a standard tractor; and a means for applying treatment fluid to a lower surface of each of said plurality of cutting blades, whereby said treatment fluid remains on said lower surface of each blade until said blade cuts vegetation, when said treatment fluid is applied to said cut vegetation at the moment of first cutting;

wherein said movable portion being openable between a closed position and an open position where said plurality of cutting blades are uniformly exposed;

said plurality of cutting blades forming a continuous blade path at least as wide as the width of the tractor.

2. The mower of claim 1, wherein said spindles are spaced across the width of said underside of said main deck, with each of said plurality of cutting blades connected in pairs to a distal spindle end of each of said spindles, said distal spindle end underneath said main deck for each of said plurality of spindles.

3. The mower of claim 1, wherein said pairs of cutting blades further comprise:

a pair of cutting blades mounted opposingly on each of said central blade shafts at opposed angled junctions;

a cutting edge of each of said cutting blades, said cutting edge aligned with a leading edge of each of said central blade shafts;

each of said opposed angled junctions form downwardly curved junctions with said cutting blades; and an angle of approximately 25 degrees formed by each of said opposed angled junctions in relation to said central blade shaft.

4. The mower of claim 3, wherein said applying means further comprises:

a plurality of conduits for delivery of treatment fluid from a treatment fluid reservoir to a proximal end of each of said spindles;

an internal conduit for fluid within each of said spindles;

a fluid dispenser bar connected at a central point to a distal end of each of said spindles, said dispenser bar receiving fluid from a respective spindle, said dispenser bar located underneath each pair of cutting blades;

at least two conduits internal to said dispenser bar, said conduits radiating outward from said central point to corners of said dispenser bar; and at least two outlet ports in opposing ends of said dispenser bar.

5. The mower of claim 4, wherein said at least two outlet ports are oriented a distance interior to said angled junction of said cutting edge, the distance interior is in the range of approximately 9.5 millimeter (0.375 inch) to approximately 15.875 millimeter (0.625 inch) inward from said angled junction of said cutting edge, with said outlet ports aligned in the range of approximately 19.050 millimeter (0.75 inch) to approximately 31.75 millimeter (1.25 inch) back from said leading edge of each of said central blade shafts.

6. The mower of claim 5, wherein said distance interior to said angled junction of said cutting edge is approximately 12.7 millimeter (0.5 inch) inward, and said outlet ports are aligned approximately 25.4 millimeter (1.0 inch) back from said leading edge of each of said central blade shafts.

7. The mower of claim 1, wherein said applying means further comprises at least one treatment fluid reservoir mounted on said tractor, said at least one reservoir is connectable in series or in parallel to another treatment fluid reservoir mounted on said tractor.

8. The mower of claim 7, wherein said applying means further comprising:
   pumping means for pumping said treatment fluid from a fluid container to said plurality of cutting blades; and
   flow control means coupled to said pumping means for metering an amount of treatment fluid, said amount of treatment fluid delivered to said plurality of cutting blades through said plurality of conduits.

9. The mower of claim 8, wherein said pumping means further comprising:
   a pump to move said treatment fluid from said fluid container to said plurality of cutting blades; and
   a flow control means coupled to said pump, said control means meters the amount of the treatment fluid to said lower surface of each of said plurality of cutting blades;
   whereby said control means meters between approximately 0.946 liter/acre (0.25 gallons/acre) to approximately 9.46 liter/acre (2.5 gallons/acre) of treatment fluid in total, during cutting and applying to vegetation, said fluid applied is a total volume as applied to each acre of vegetation, as cut by said plurality of pairs of cutting blades.

10. The mower of claim 9, wherein said treatment fluid is continuously applied to the cut vegetation from said lower surface of each of said plurality of cutting blades at the time of cutting, and said treatment fluid is absorbed directly into the interior vertical pores of the cut vegetation.

11. The mower of claim 10, wherein said continuously applied treatment fluid is absorbed at between about 90 percent and about 95 percent of said treatment fluid applied from said lower surface of each of said plurality of cutting blades to the cut vegetation.

12. The mower of claim 1, wherein said mower further comprising:
   at least one blade belt drive, said blade belt drive rotatably mounted to said mower deck;
   a continuous belt connectable to said blade belt drive;
   each of said rotatable spindles connectable to said continuous belt;
   wherein each pair of said plurality of pairs of cutting blades is separately rotatably mounted to one of said plurality of blade spindles.

13. The mower of claim 1, wherein said movable portion comprises a clam shell attachable to said distal edge of said main deck.

14. The mower of claim 1, wherein said means for securing the mower is connectable to either a front end or rear end of a standard tractor, said securing means further comprising a three-point hitch from said movable portion of said convertible deck, said three-point hitch including at least one hydraulic piston for adjustment of the height of said movable portion.

15. A method of cutting vegetation and treating cut vegetation with a treatment fluid at the moment that vegetation is initially cut, said method comprising the steps of:
   providing a plurality of pairs of cutting blades, said plurality of pairs of cutting blades connecting with fluid dispenser bars leading to a treatment fluid container;
   rotating said plurality of pairs of cutting blades;
   pumping said treatment fluid from the container to each of said pairs of cutting blades;
   placing treatment fluid across a lower surface of each of said pairs of cutting blades;
   cutting the vegetation with said plurality of pairs of cutting blades by a leading edge of each of said cutting blades;
   moving said lower surface of each of said pairs of cutting blades across the cut vegetation; and
   delivering treatment fluid from said lower surface of each of said pairs of cutting blades to said cut vegetation during the initial cutting step of the vegetation.

16. The method of claim 15, said providing step further comprising the steps of:
   connecting each of said plurality of pairs of cutting blades to a rotatable cutting blade drive spindle;
   aligning fluid conduits within said drive spindles with said fluid conduits leading to said container; and
   rotating said plurality of pairs of cutting blades.

17. The method of claim 16, wherein said placing step further comprising the steps of:
   aligning a fluid dispensing bar outlet with each leading edge of each of said plurality of pairs of cutting blades;
   dispensing said treatment fluid evenly across said lower surface of each of said pairs of cutting blades; and
   maintaining the speed of said rotating cutting blades for dispensing of said treatment fluid across said lower surface of each of said pairs of cutting blades.

18. The method of claim 15, wherein said delivering step further comprising the steps of:
   pumping the treatment fluid from said fluid container through said fluid conduits to said lower surface of each of said cutting blades; and
   controlling said delivering step to an amount adequate for applying said treatment fluid to said cut vegetation.

19. The method of claim 15, wherein the providing step further comprises mounting said plurality of cutting blades on a mower attachable to a tractor, said mower having a generally planar mower deck.

20. The method of claim 15, wherein said delivering step delivers said treatment fluid continuously from said lower surface of each of said cutting blades to said cut vegetation, with said treatment fluid absorbing directly into interior pores of said cut vegetation.

21. The method of claim 20, wherein said treatment fluid is absorbing at between about 90 percent and about 95 percent of said treatment fluid of said delivering step into said interior vertical pores of said cut vegetation.

22. The method of claim 21, wherein said absorbing is directly into said interior vertical pores of said cut vegetation, with migrating of said treatment fluid to the root system of said cut vegetation.

23. A method for clearing brush and cutting vegetation utilizing a brush-cutting mower comprising the steps of:
   (a) providing a mower, said mower having a self-propelled tractor attachable to said mower;
   (b) providing a plurality of pairs of cutting blades on said mower;
   (c) rotating said plurality of pairs of cutting blades during operating of said mower;
   (d) pumping vegetation treatment fluid onto a lower surface of each of said cutting blades;

(e) cutting brush and vegetation with said cutting blades; and (f) applying vegetation treatment fluid from said lower surface of each of said cutting blades onto said cut brush and vegetation simultaneously with said cutting step.

24. The method of claim 23, wherein said applying step further comprises continuously applying the vegetation treatment fluid to the cut brush and vegetation at the time of initial cutting, said cut vegetation absorbing said vegetation treatment fluid directly into interior pores of the cut vegetation.

25. The method of claim 23, wherein said continuously applying step further comprises applying between about 90 percent to about 95 percent of said vegetation treatment fluid to the cut vegetation at the time of cutting, said vegetation treatment fluid absorbing directly into the interior vertical pores of said cut brush and vegetation.

26. A vegetation cutting and treatment fluid dispenser apparatus comprising:

at least two cutting blades interconnected by angled junctions to a central horizontal shaft, said blades, angled junctions, and central horizontal shaft rotatable as one unit, said angled junctions extending down and outward from a midpoint opening of said central horizontal shaft to each of said blades;

a leading edge of each of said blades, said leading edge curved downward to form said lower surface of each of said blades;

a trailing edge of each of said blades, said trailing edge curving upward away from said lower surface;

an upper surface of each of said blades, said upper surface curves upward from said leading edge to said upward curing trailing edge;

a fluid dispenser mounted on said apparatus;

a fluid dispenser bar communicating with said fluid dispenser, said bar attachable at a central opening to the underside of said central shaft, said dispenser bar having opposing ends terminated at the angled junction of said central shaft and said leading edge curved downward to said lower surface;

a central spindle, said spindle including:

a stationary housing enclosing a midsection of said central spindle, said housing containing a plurality of cylindrical bearing collars, said collars placed above and below said midsection, said collars allowing rotation of said spindle within said stationary housing;

a distal end of said spindle attachable through said midpoint opening of said central horizontal shaft, said spindle rotatable with said shaft and blades, said attachable distal end of said spindle extends underneath said central shaft and is positionable through said central opening of said fluid dispenser bar;

a means for rotating said central spindle; and a means for pumping fluid through said central spindle, through said fluid dispenser bar, to said leading edge curved downward to form said lower surface of each of said blades.

27. The cutting and fluid dispenser apparatus of claim 26, wherein of each of said blades further comprises:

a continuous lower surface extending from each of said angled junctions to said leading edge, said continuous lower surface forms the underside of each blade, extending rearward to said trailing edge of each of said blades;

an angle of said angled junctions of about 24.5° to about 25.5° between said angled junctions connected to said lower surface, and said central shaft; and a cutting edge formed by said leading edge of each of said blades.

28. The cutting and fluid dispenser apparatus of claim 27, wherein said fluid dispenser further comprises:

a fluid dispenser bar having a parallelogram shape, said bar attachable underneath said central horizontal shaft;

outlet ports located at the extended corners of said bar, each of said ports oriented toward said leading edge of each of said blades, and oriented toward the lower surface of each of said blades; and channels through said bar, said channels extending from a central circular opening of said bar, to each of said outlet ports at the extended corners of said bar, said channels provide for movement of said fluid to each of said outlet ports.

29. The cutting and fluid dispenser apparatus of claim 28, wherein said outlet ports further comprise said ports are located interior to, and approximately 12.7 millimeter (0.5 inch) inward from said leading edge, and approximately 24.4 millimeter (1.0 inch) back from the interior side of said leading edge of said lower surface of each of said blades.

30. The cutting and fluid dispenser apparatus of claim 26, wherein said pumping means further comprises:

at least one peristaltic pump, said pump connectable by exterior tubing to said central spindle, said pump provides fluid at a controllable rate to said housing enclosing said central spindle; and at least one fluid storage container, said at least one container attachable by exterior tubing to said pump.

31. The cutting and fluid dispenser apparatus of claim 30, wherein said central spindle further comprises:

a pair of rotational seals within said housing, said seals encircling said central spindle at said mid-section of said central spindle, said seals placed within said collars placed above and below said mid-section; a cavity within said housing, said cavity formed by said pair of seals encircling said central spindle, said cavity receives fluid from said housing;

a fluid conduit in the exterior surface of said midsection of said central spindle, said fluid conduit extending to the central axis of said central spindle, said fluid conduit continuing along the central axis of said central spindle;

a plurality of exit openings at a distal end of said central spindle, said exit openings placeable in close proximity to said channels within said fluid dispenser bar to allow said fluid to move into said channels of said fluid dispenser bar; and tubing extending through said channels, said tubing extending to said outlet ports located at the extended corners of said bar;

whereby said pump moves fluid into said cavity for receiving fluid, fluid moves across said cavity to said fluid conduit in the exterior surface of said mid-section of said central spindle, and through said central axis to said exit openings end of said central spindle, said fluid moves across said exit openings into said channels within said fluid dispenser bar, through said tubing for exit from each of said outlet ports at said controllable rate of fluid movement.

32. The cutting and fluid dispenser apparatus of claim 26, wherein said upper surface curves upward further comprises a surface area of said upper surface that is larger than the surface area of said lower surface of each of said blades, with air movement across said upper surface during rotation of said blades, and with creation of a higher air pressure across said lower surface in relation to a lower air pressure across said upper surface, whereby said higher air pressure across said lower surface holds fluid onto said lower surface of each of said blades as said fluid exits from said fluid dispenser bar.

33. The cutting and fluid dispenser apparatus of claim 31, wherein each of said outlet ports dispense fluid onto said lower surface of each of said blades, near said leading surface of each of said blades, during the rotating of said blades, with movement of said fluid across said lower surface from said leading edge to said trailing edge dependent on the blade rotation speed, on the air pressure across said lower surface, and on the constant rate of fluid movement from each of said outlet ports.

34. The cutting and fluid dispenser apparatus of claim 33, wherein said fluid is removed from said movement across said lower surface as articles cut by said leading edge brush across said lower surface, said fluid is placed onto the cut ends of said articles.

35. The cutting and fluid dispenser apparatus of claim 34, wherein said fluid is removed from said movement across said lower surface as articles cut by said leading edge brush across said lower surface, said fluid is not placed onto the sides of said articles.

36. The cutting and fluid dispenser apparatus of claim 35, wherein said central circular opening of said bar further comprises:

a cylindrical gap, said gap in close proximity with said plurality of exit openings of said spindle, and gap accepting fluid from said exit openings as said spindle rotates; and central ends of said channels of said fluid dispenser bar, said central ends in fluid communication with said gap;

whereby said fluid moves across said gap, through said channels, through said tubing for exit from each of said outlet ports at said controllable rate of fluid movement.

37. The cutting and fluid dispenser apparatus of claim 30, wherein said at least one fluid storage container further comprises:

an inlet port and an outlet port, said inlet port and said outlet port is attachable to said tubing connectable to additional fluid storage containers;

a multi-sided shape for said containers, said shape allows for stacking of said containers;

a fill opening, said opening centrally located on one side of said container, said opening allows for refilling of said containers.

38. A method of cutting vegetation and treating the cut vegetation with a treatment fluid at the time that the vegetation is cut, said method comprising the steps of:

(a) providing at least one cutting blade, a fluid container and a fluid conduit extending between the fluid container and the at least one cutting blade;

(b) cutting the vegetation using the at least one cutting blade; and (c) delivering a continuous layer of the treatment fluid to the at least one cutting blade so that the treatment fluid is continuously available to the cut vegetation at the time that the vegetation is cut, said delivering step further comprising the steps of:

(i) pumping the treatment fluid from the fluid container through the fluid conduit to a lower surface of the at least one cutting blade;

(ii) placing said continuous layer of treatment fluid onto a lower surface of the at least one cutting blade;

(iii) controlling the amount of treatment fluid on the lower surface which is continuously available to the cut vegetation at the time that the vegetation is cut;

(iv) moving the at least one cutting blade over the cut vegetation after said cutting step;

(v) contacting the cut vegetation with said continuous layer of treatment fluid on the lower surface of the at least one cutting blade;

(vi) placing treatment fluid onto the cut pores of the cut vegetation at the time of initial cutting; and (vii) initiating absorption of said treatment fluid into the cut pores of the cut vegetation;

wherein said initiating step places treatment fluid into the interior pores of the cut vegetation for natural transport to the root system of the cut vegetation.

39. The method of claim 38, wherein the placing step provides between about 90 percent and about 95 percent of the treatment fluid that is continuously available to the cut vegetation at the time that the vegetation is cut for absorbing directly into the interior vertical pores of the cut vegetation.

40. The method of claim 38, wherein said providing step further comprises the steps of:

(a) securing the at least one cutting blade to a rotatable cutting blade drive means;

(b) rotating the at least one cutting blade using the cutting blade drive means;

(c) attaching the at least one cutting blade underneath a mower enclosure; and (d) connecting the mower enclosure to a tractor.

41. The method of claim 38, wherein the initiating step provides treatment fluid that is absorbed directly into the interior vertical pores of the cut vegetation, the treatment fluid migrates to the root system of the vegetation.

42. The method of claim 41, wherein the initiating step provides treatment fluid that is delivered to the at least one cutting blade is not broadcast to the ground, and does not contaminate the soil surrounding the vegetation and the underground water supply.

43. The method of claim 42, wherein the treatment fluid is delivered to the underside of the at least one cutting blade and is applied directly to the remaining stems of the cut vegetation.

44. The method of claim 43, wherein the treatment fluid is delivered to the underside of the at least one cutting blade and is not applied to the uncut stems and branches of the cut vegetation.

\* \* \* \* \*